(12) United States Patent
Halstenberg

(10) Patent No.: US 9,314,902 B2
(45) Date of Patent: Apr. 19, 2016

(54) BLASTING AGENT AND BLASTING METHOD

(75) Inventor: Jörg Halstenberg, Bad Oeynhausen (DE)

(73) Assignee: Kompoferm GmbH (DE)

( * ) Notice: Subject to any disclaimer, the term of this patent is extended or adjusted under 35 U.S.C. 154(b) by 332 days.

(21) Appl. No.: 13/640,906

(22) PCT Filed: Apr. 15, 2010

(86) PCT No.: PCT/EP2010/007567
§ 371 (c)(1),
(2), (4) Date: Oct. 12, 2012

(87) PCT Pub. No.: WO2011/127952
PCT Pub. Date: Oct. 20, 2011

(65) Prior Publication Data
US 2013/0029563 A1    Jan. 31, 2013

(30) Foreign Application Priority Data
Apr. 15, 2010 (EP) .................................... 10003976

(51) Int. Cl.
B24B 11/00 (2006.01)
B24C 9/00 (2006.01)
B24C 11/00 (2006.01)

(52) U.S. Cl.
CPC ............... *B24C 11/005* (2013.01); *B24C 9/006* (2013.01); *Y02P 70/179* (2015.11)

(58) Field of Classification Search
CPC ...... B24C 1/001; B24C 1/086; B24C 11/005; B24C 5/06; B24C 5/064; B24C 7/00; B24C 7/0092; B24C 9/00; B24C 9/006
USPC ........... 451/38, 39, 75, 87, 88, 99, 36, 94, 95, 451/97
See application file for complete search history.

(56) References Cited

U.S. PATENT DOCUMENTS 4,175,159 A * 11/1979 Raleigh .......................... 428/405
5,376,157 A * 12/1994 Yam et al. ........................ 51/307
(Continued)

FOREIGN PATENT DOCUMENTS

| EP | 0 612 585 A1 * | 8/1994 | ................ B24C 9/00 |
| EP | 0612585 | 8/1994 | |

(Continued)

OTHER PUBLICATIONS

Application Instructions PanataTech Fast Metal Cleaning System, Blasting Media Additive PantaTech Ultimate, Jun. 30, 2012.

(Continued)

*Primary Examiner* — Monica Carter
*Assistant Examiner* — Lauren Beronja

(57) ABSTRACT

A system including at least one means for mechanical processing of surfaces, in particular steel or cast iron beads using a blasting agent (5). An additive (6) for degreasing and cleaning of the surface to be blasted (2) and/or of the blasting agent is provided with the blasting agent (5), and comprising a granular material (6), which exhibits a lower breaking strength under the mechanical stresses that the blasting agent (5) is subject to during the blasting procedure than the at least one means for mechanical processing of the surfaces themselves. As the granular material (6) breaks down, additional additive (6) is added into the blasting agent (5) such that the proportion of the additive (6) in the blasting agent mixture blend (5) remains largely generally constant even at a prolonged operation of the device.

4 Claims, 1 Drawing Sheet

(56) References Cited

U.S. PATENT DOCUMENTS

| | | | | |
|---|---|---|---|---|
| 5,591,064 | A | * | 1/1997 | Spears, Jr. .......................... 451/2 |
| 5,827,114 | A | * | 10/1998 | Yam et al. ......................... 451/75 |
| 2003/0224702 | A1 | * | 12/2003 | Roulston et al. ................ 451/28 |

FOREIGN PATENT DOCUMENTS

| | | |
|---|---|---|
| EP | 1180504 | 7/2001 |
| JP | 2003093925 A * | 4/2003 |
| WO | 2009016448 | 2/2009 |
| WO | WO 2009016448 A2 * | 2/2009 |

OTHER PUBLICATIONS

International Search Report and Written Opinion in PCT application PCT/EP2010/007567, EPO, Mar. 10, 2011.

Translation of the International Preliminary Report for PCT Application No. PCT/EP2010/007567, WIPO, Oct. 16, 2012.

\* cited by examiner

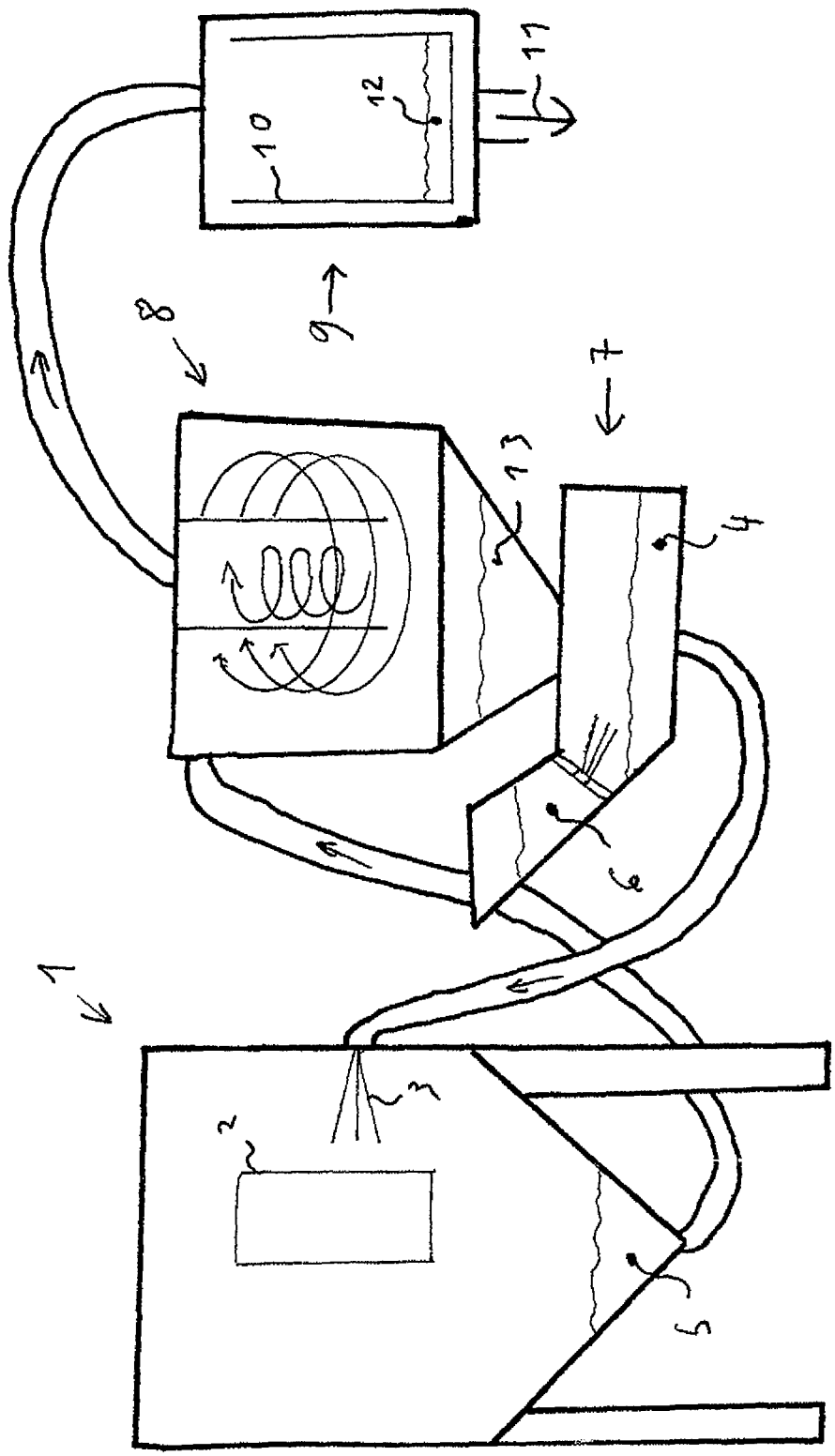

BLASTING AGENT AND BLASTING METHOD

TECHNICAL FIELD

The invention relates to a blasting agent as well as its manufacture and to a blasting method as well as a device for carrying out the blasting method

BACKGROUND INFORMATION

Blasting methods are known from the state-of-the-art. Common to them is that a means for mechanical processing of surfaces (hereinafter also: actual blasting agent), which is usually a granular material, is shot onto a surface to be blasted. Here, granular material refers to a granular material in the broadest sense of the term, i.e., a material consisting of particles with a defined size distribution, and where symmetrically shaped particles such as spheres shall also be considered granular material below. The shape, the size distribution and the material of which the granules are made are selected according to the material of the workpiece to be processed and the desired effect of the blasting procedure on the workpiece. The purpose of the procedure may be to free a surface of an old coating, to prepare a surface for a new coating, but also to polish the surface or improve its mechanical properties.

Accordingly, edged granular material is often selected as blasting agent, for example, if the processing purpose is to remove material from the surface or to roughen a surface, or round granular material is selected if the surface is to be polished or its mechanical properties are to be improved, for example, using the so-called shot blasting. In principle, however, material can also be removed using round granular material.

A variety of materials can be used as blasting agents, for example steel, cast iron, corundum, glass, garnet sand, and—depending on the purpose—even more exotic materials such as crushed nutshells. The grain typically varies from 0.1 to 3 mm.

Parts that have grease, oils, silicone oil layers, release agent residue or similar substances on their surfaces to be blasted are problematic for conventional blasting methods. Because the blasting agent typically runs through a circular process and is re-used in blasting systems, such types of workpieces lead to an enrichment of contaminants in the blasting agent, causing increased need for cleaning of the blasting system and the blasting agent. For this reason, prior cleaning of the workpieces is often prescribed by blasting system manufacturers, which causes significant health and environmental risks and thus additional costs due to the solvents used.

SUMMARY

It is, therefore, the objective of the invention to specify a blasting method and aids for its implementation, which is more efficient, more environmentally friendly and non-hazardous with regard to health and safety when processing workpieces that exhibit the above mentioned contaminants.

This objective is solved by a blasting agent as set forth herein, the use of an additive for manufacturing or enriching a blasting agent as further set forth herein, a blasting method as set forth as well as a device for carrying out the blasting method and the use of a blasting agent as set forth in the claims.

According to the invention, a blasting agent is used that contains an additive, which is responsible for degreasing and cleaning of the surface to be blasted in addition to at least one means for mechanical processing of surfaces (in the following: actual blasting agent). According to the invention, the additive is a granular material as well which exhibits a lower breaking strength than the actual blasting agent under the mechanical stresses that the blasting procedure is subjected to. In this case, breaking strength refers to the ability of the granules not to burst when impacting the surface to be blasted at an impact speed that is typical for blasting methods.

The inventive use of an additive is particularly beneficial when using steel or cast iron beads as the actual blasting agent, because their own abrasive wear is low.

As a result, the granules of the additives are crushed during the blasting process and during the transport within the system, e.g., via transport screws or bucket conveyors, while the granules of the actual blasting agent typically survive intact. The crushing process increases the relative surface of the additive, such that most of the existing contaminants that exist at the surface of the workpiece do not adhere to the granules of the actual blasting agent but to the crushed granules of the additive. In this manner, the crushed portion can be removed easily from the blasting agent mixture using a particle size selective separation method thus easily discharging the contaminants from the process. This can be done, for example by air separation or the use of a sizing cyclone separator, where the blasting agent mixture is divided into a portion that primarily contains the actual blasting agent and yet uncrushed portions of the additive, and a portion containing the crushed components of the additive charged with the contaminants as well as other fine grain contaminants, such as, for example, abrasions from workpieces or from the granules of the actual blasting agent. While the first portion is typically returned into the blasting process, the second portion may be separated in filters, for example, and supplied to an appropriate disposal process.

Because the additive is used up in this process, the proportion of the additive decreases steadily in the circulation process typical for blasting systems. It is therefore advantageous, to provide a device for a metered supply of the additive, where the metered supply is advantageously controlled such that the volume ratio between additive and the actual blasting agent experiences minimal fluctuations and ideally remains constant in the blasting agent that runs through the circulation process.

The use of the blasting agent and the blasting method subject to the invention proves to be particularly advantageous if combined with a spinner blasting system. In this design of the blasting system, the blasting agent is not accelerated by a flow of air, as is common in most blasting systems, but the granules are accelerated by a surface attached to a rotating wheel and shot against the workpiece. With this method, an impact stress of granules exists already when the granules impact the surfaces of the spinning wheel, which causes partial crushing of the additive already prior to the impact on the workpiece.

According to the invention, all materials that are present as granules in the sense described above and exhibit a low breaking strength, at minimum one lower than the actual blasting agent, under the conditions that exist at the time of impact of the granules on the surface to be blasted are suitable as additives.

Even essentially hard materials can be used if they break apart easier during the impact stress during blasting due to their brittleness than the actual blasting agent if the latter exhibits a higher ductility. For example salts or oxides may be used as additives, of which in particular silicon oxide especially in its naturally occurring form of perlite is suited.

Also advantageous are additives whose granules are porous solids, i.e. a granular material which exhibits an inner porosity. The internal porosity is the cause for mechanical weakening of the granules and has an advantageous effect in creating an essentially large surface through the breaking of the particles. Particularly advantageous is the use of expanded perlite, which is characterized by the fact that crystallization water contained in the perlite creates an inner porosity in the granules of the perlite during the expansion process.

In addition to a reasonable price, the perlite exhibits additional features that are beneficial in the selection of the actual blasting agent and a fitting additive. For example, it is not harmful to health and environment, and it cannot cause a dust explosion. In particular when using separation devices such as sifters and/or cyclone separators, perlite can contribute to the suppression of fire or explosion hazards. In the crushed condition it can be separated easily from the other blasting agents in use and has no properties that damage the workpiece, for example, corrosive properties. In addition, when the crushed perlite is separated from the process air through filters, it contributes to facilitating the cleaning of the filters due to its fat-binding effect.

BRIEF DESCRIPTION OF THE DRAWING

These and other features and advantages of the present invention will be better understood by reading the following detailed description, taken together with the drawings wherein:

FIG. 1 is a view of a preferred embodiment of the invention.

DETAILED DESCRIPTION OF THE PREFERRED EMBODIMENTS

The exemplary device according to the invention exhibits a blasting device 1 in which the blast 3 impacts the workpiece 2. The blasting agent 5 used is captured and supplied to the processing device 8. In said processing device, a first portion 13, which essentially contains the actual blasting agent as well as the un-crushed portion of the additive, is separated using a sizing cyclone separator or an air separator, and separated from a second portion 12, which is preferably discharged by a carrier air stream and that contains the crushed portion of the additive as well as abrasions of the workpiece and/or of the blasting agent and the contaminants to be removed from the process, all of which are provided to a filter device 9. The second portion 12 can be removed from the carrier air stream using a filter 10 and discharging only uncontaminated air 11.

In the preferred embodiment, the additive may be a material such as PantaTec ULTIMATE™ available from PantaTec GmbH of Bad Oeynhausen Germany, the specification, use and testing of which is fully incorporated herein by reference. As is known in the art, the optimum concentration of the additive is determined in advance by conducting measurements. Throughout the cleaning process, the concentration of the additive in the mixture is determined as indicated by the manufacturer of the additive. Depending on the degree of contamination, experimental data gives the user an indication of how much additive to add. The step of adding additional additive can be performed either by hand (by simply pouring the additive directly into the blasting agent) or by using an automatic device as is well known in the art and shown, for example, in the PantaTec brochure.

According to one feature of the invention, a device 7 as is known in the art may be present for the automated metered supply of the granular additive 6 and is used to add the additive to the circulating blasting agent 5 and that preferably meters the added additive such that the proportion of the additive in the blasting agent mixture blend 5 remains largely constant even at a prolonged operation of the device.

Modifications and substitutions by one of ordinary skill in the art are considered to be within the scope of the present invention, which is not to be limited except by the following claims.

The invention claimed is:

1. A blasting system (1), including a blasting agent (5) for mechanical processing of surfaces (2) by blasting, said blasting agent (5) including steel or cast iron beads, characterized in that an additive (6) for degreasing and cleaning of surface contaminants on the surface to be blasted (2) is provided, said additive (6) comprising a granular material (6) which exhibits a lower breaking strength than a blasting strength of the blasting agent (5) under the mechanical stresses that the blasting agent (5) and additive (6) are subject to during the blasting procedure, said granular material (6) comprising perlite, wherein said granular material (6) is configured to be crushed during said blasting carried out in said blasting system (1), said crushed granular material exhibiting a greater surface area than that of uncrushed granular material additive (6) and of said blasting agent (5), for providing a surface to which said surface contaminants from the surface blasted (2) adhere.

2. The blasting system as set forth in claim 1, wherein said perlite includes expanded perlite.

3. The blasting system of claim 1, wherein said blasting system is a spinner blasting system.

4. The blasting system of claim 1, wherein said blasting system is configured for suppressing fire and explosion hazards in separation devices for the separation of particles from gases, wherein said separation devices include air separators and cyclone separators.

\* \* \* \* \*